United States Patent [19]
Fukushima et al.

[11] Patent Number: 5,144,503
[45] Date of Patent: Sep. 1, 1992

[54] PROCESS FOR CONTROLLING AN ACCESS POSITION OF A RECORDING HEAD WHICH ENABLES RECORDING AT EACH RECORDING POSITION ON A RECORDING MEDIUM WITHOUT DOUBLE RECORDING AND A DEVICE THEREFOR

[75] Inventors: Nobuo Fukushima; Masaya Maeda; Nobuo Tezuka, all of Kanagawa, Japan

[73] Assignee: Canon Kabushiki Kaisha, Tokyo, Japan

[21] Appl. No.: 769,568

[22] Filed: Oct. 2, 1991

Related U.S. Application Data

[63] Continuation of Ser. No. 423,707, Oct. 16, 1989, abandoned, which is a continuation of Ser. No. 826,498, Feb. 5, 1986, abandoned.

[30] Foreign Application Priority Data

Feb. 7, 1985 [JP] Japan .................................. 60-22634

[51] Int. Cl.⁵ ........................ G11B 19/02; G11B 21/02
[52] U.S. Cl. ..................................... 360/69; 360/72.1; 360/75; 360/78.04; 369/32; 369/58; 369/233
[58] Field of Search ......................... 360/27, 31, 53, 55, 360/60, 69, 71-72.2, 74.1, 74.4, 75, 78.04, 78.08, 105, 99.02, 99.03, 99.06, 99.07, 48; 358/906; 369/30, 32, 33, 41, 43, 50, 53, 54, 56, 57, 58, 176, 233, 243, 261, 292

[56] References Cited

U.S. PATENT DOCUMENTS

| | | | |
|---|---|---|---|
| 3,956,766 | 5/1976 | Hanson et al. | 360/75 |
| 4,124,868 | 11/1978 | Malissin et al. | 369/44 |
| 4,142,209 | 2/1979 | Hedlund et al. | 369/47 |
| 4,229,808 | 10/1980 | Hui | 369/48 |
| 4,418,367 | 11/1983 | Nagai et al. | 360/75 |
| 4,542,427 | 9/1985 | Nagai | 360/72.1 |
| 4,594,701 | 6/1986 | Earman et al. | 360/72.1 |
| 4,608,613 | 8/1986 | Miyake | 360/78 |
| 4,792,869 | 12/1988 | Fujita | 360/69 |

FOREIGN PATENT DOCUMENTS

| | | | |
|---|---|---|---|
| 2643052 | 4/1977 | Fed. Rep. of Germany . | |
| 3130861 | 3/1982 | Fed. Rep. of Germany . | |
| 3135397 | 6/1982 | Fed. Rep. of Germany . | |
| 54-140507 | 10/1979 | Japan | 360/78 |
| 55-089921 | 7/1980 | Japan | 369/47 |
| 57-064342 | 4/1982 | Japan | 369/44 |
| 58-114353 | 7/1983 | Japan | 369/50 |
| 58-189802 | 11/1983 | Japan | 358/906 |
| 59-065935 | 4/1984 | Japan | 369/58 |

Primary Examiner—Aristotelis Psitos
Assistant Examiner—Steven R. Garland
Attorney, Agent, or Firm—Anderson, Kill, Olick

[57] ABSTRACT

A recording apparatus arranged to shift a recording head in a given direction relative to a record bearing medium and to perform recording in each shifted position. In positioning the recording head, the presence or absence of a record in each recording track on the medium is detected by checking them one after another in a direction reverse to the given direction from a given position. Then, the head is positioned at the first of consecutive blank recording tracks by positioning the head at a point determined by shifting the head to a given extent in the given direction from a position where the presence of a record is first detected among others by the checking operation.

25 Claims, 10 Drawing Sheets

PROCESS FOR CONTROLLING AN ACCESS POSITION OF A RECORDING HEAD WHICH ENABLES RECORDING AT EACH RECORDING POSITION ON A RECORDING MEDIUM WITHOUT DOUBLE RECORDING AND A DEVICE THEREFOR

This is a continuation application of Ser. No. 07/423,707, filed Oct. 16, 1989, now abandoned, which in turn is a continuation application of Ser. No. 06/826,498, filed Feb. 5, 1986, now abandoned.

BACKGROUND OF THE INVENTION

1. Field of the Invention

This invention relates to a head positioning method employed in a recording apparatus for shifting a recording head in a given direction relative to a record bearing medium for recording in each of shifted positions on the medium.

2. Description of the Prior Art

The known recording apparatuses include the kind having a movable head for recording, on a rotary recording medium such as a magnetic disc or a magnetic cylinder, a unit length of information (such as one field or one frame portion of a video signal or the like) in each of recording tracks which are formed in a concentric circular shape or in an annular shape on the recording medium, accordingly, as the information is recorded. In preventing overlapped recording in recording the information with the apparatus of this kind, for example, the head must be first accurately positioned at an unrecorded part of the recording medium. In accordance with a known method employed in the conventional apparatus, a desired recording position of the head on the recording medium is checked for the presence or absence of any previous record therein before recording. In the event of the presence of a previous record, the head is shifted to a next desired recording position. The head is thus positioned at an unrecorded part of the recording medium with such a check-up process repeated before recording. An example of this method was disclosed in Japanese Laid-Open Patent Application No. SHO 54-140515.

With the head positioning method of the prior art arranged as described above, in case that a record in an intermediate recording track has been erased, the head is first positioned at that erased track. Therefore, in shifting the head to a next recording position after completion of recording, the presence or absence of a record must be detected again at every point to which the head is shifted. The possibility of overlapped recording otherwise cannot be eliminated. In that instance, it takes a long period of time in bringing the head to an unrecorded part for a next recording process. Then, a good opportunity for recording (a shutter chance in the case of a camera) would be missed. Further, it becomes hardly possible to adequately carry out continuous recording, such as still video recording for several consecutive fields per second or for several consecutive frames.

SUMMARY OF THE INVENTION

It is an object of this invention to provide a head positioning method for a recording apparatus arranged to shift a recording head in a given direction relative to a record bearing medium and to perform recording in each shifted position, whereby the presence or absence of a record in each of recording positions on the medium is detected by examining them one after another in sequeuce in a direction reverse to the given direction from a given position; and the head is positioned at a point determined by shifting it to a given extent in the given direction from a point where the presence of a record is first detected by the examining process.

To attain this object, a recording or reproducing apparatus arranged as an embodiment of this invention to shift a recording head in a given direction relative to a recording (or record bearing) medium and to perform recording in each shifted position comprises: detecting means which detects the presence or absence of a record in each of recording positions on the medium by checking them one after another in a direction reverse to the given direction from a given position; and head positioning means which shifts the recording head to a given extent in the given direction from a point where the presence of a record is first detected by the checking operation performed by the detecting means.

Another embodiment of this invention comprises: control means for allowing a recording head to adequately have access to a recording medium in a given direction; detecting means for detecting the presence or absence of a record in each of recording positions on the medium by examining these positions one after another in a direction reverse to the given direction from a given point on the medium in response to commencement of a specific operation; and head positioning means for causing the recording head to have access to the medium by shifting it to a given extent in the given direction from a recording position where the presence of a record is first detected by the detecting means.

The recording apparatus which is of the kind arranged to shift a recording head in a given direction relative to a recording medium and to perform recording in each shifted position and is arranged according to this invention is capable of accurately controlling the position of the head relative to an unrecorded part of the recording medium located just after the last of recorded recording tracks in the above stated given direction on the medium. This is a great advantage for a recording apparatus of this kind.

These and further objects and features of this invention will become apparent from the following detailed description of preferred embodiments thereof taken in connection with the accompanying drawings.

DETAILED DESCRIPTION OF THE PREFERRED EMBODIMENTS

Figure 1:
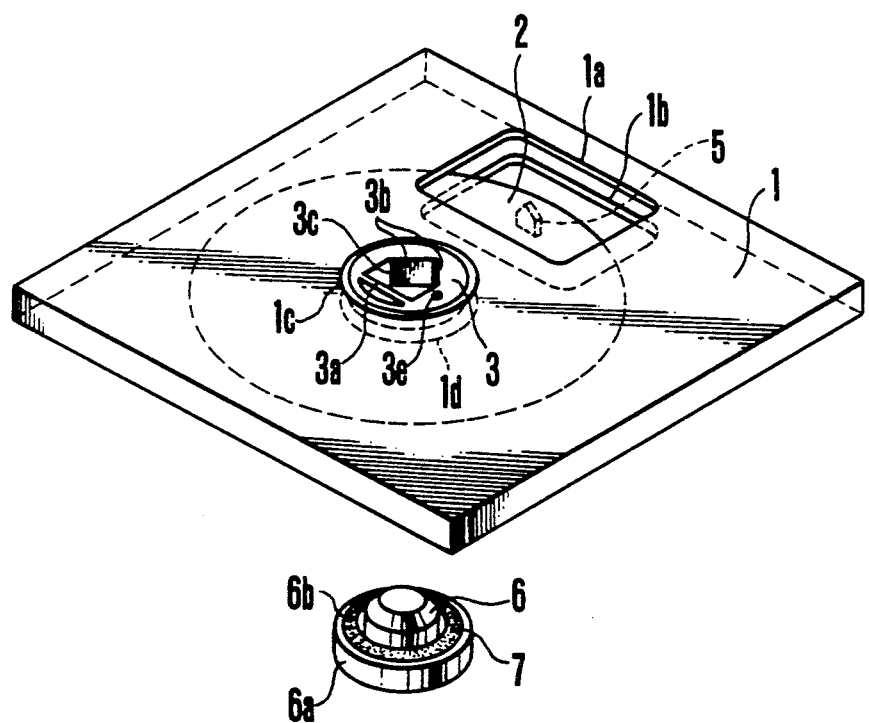
FIG. 1 is an oblique view showing a recording medium and its carrier usable by a recording or reproducing apparatus arranged as an embodiment of this invention the illustration also including a driving part disposed on the side of the apparatus.
Figure 2:
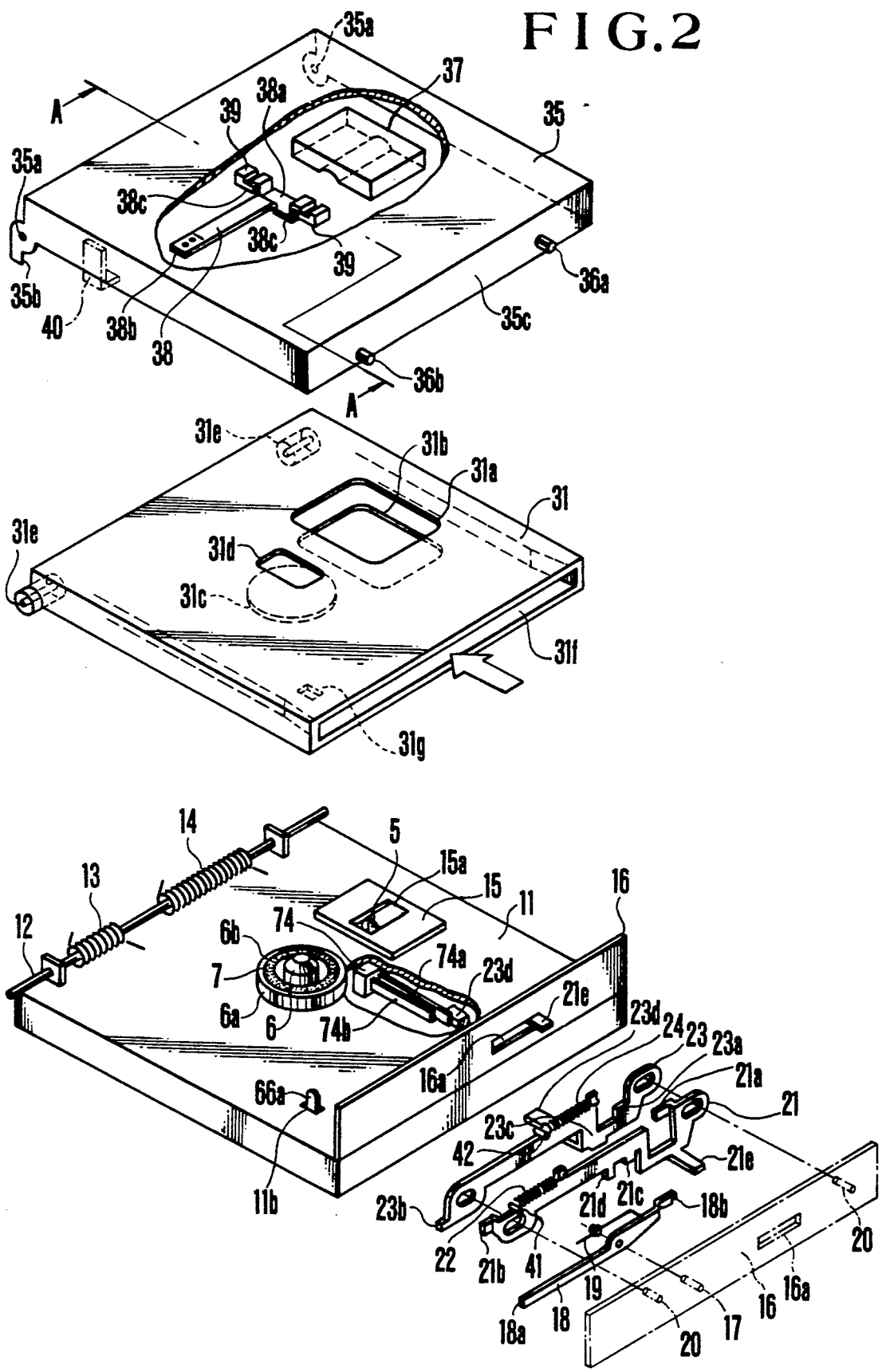
FIG. 2 is an oblique exploded view showing the embodiment of this invention and particularly the cassette and disk loading arrangement thereof.

Referring to FIG. 1, a recording medium (or record bearing medium) to be used by an embodiment of this invention is arranged as described below:

A cassette 1 is arranged to carry the recording medium. A flexible rotary magnetic disc 2 which is employed as the recording medium is disposed within the cassette 1. The magnetic disc 2 is provided with a center core 3 which serves as a mount part and is made of a synthetic resin. The core 3 is disposed in the middle part of the disc 2. To the lower surface of the center core 3 is secured a magnetizable plate 3d as shown in FIGS. 3B and 3C. A magnetic pin 3e is erected on the magnetizable plate 3d to pierce the center core 3. The cassette 1 is provided with upper and lower apertures 1a and 1b which are respectively arranged to permit insertion of stabilizing plates 37 and 15 for stabilizing the rotation of the magnetic disc 2 as shown in FIG. 2. A recording magnetic head 5 is arranged to come through the lower aperture 1b either into contact or close to the recording surface of the magnetic disc 2. The center core 3 is arranged to be mounted on a spindle 6 which is arranged on the side of the apparatus for driving the magnetic disc to rotate. An engaging hole 3c is provided in the center core 3 for that purpose. The engaging hole 3c consists of slanting side face parts 3b and a spring part 3a. The spring part 3a is arranged to push the spindle 6 against the slanting side face parts 3b. A permanent magnet 7 is arranged at the flange part 6a of the spindle 6 in a position to correspond to the magnetizable plate 3d disposed on the lower surface of the center core 3. When the center core 3 is mounted on the spindle 6, the magnetizable plate 3d is sucked by the permanent magnet 7 to have so-called magnetic chucking effected thereby. Then, the lower surface of the center core 3 comes to abut on the flange surface 6b of the flange part 6a of the spindle 6. By this, the height of the magnetic disc is defined relative to the head 5. The cassette 1 is provided further with upper and lower apertures 1c and 1d which are arranged for the center core 3.

An embodiment of this invention which uses the magnetic disc cassette mentioned above is arranged as follows:

Referring to FIG. 2, the recording apparatus which embodies this invention is provided with a body chassis 11. The spindle 6 and the head 5 are arranged on the chassis 11 to be rotatable and movable respectively. A hinge shaft 12 is arranged on the chassis 11. A side plate 16 which is also disposed on the chassis 11 is provided with a shaft 17. On the shaft 17 is provided a clamp lever 18 which is under a clockwise urging force of a spring 19. A pair of pins 20 are erected on the side plate 16. Two slidable lock levers 21 and 23 are arranged to be guided by these pins 20 under leftward (as viewed on the drawing) urging forces of springs 22 and 24. Further, pins 41 and 42 are also erected on the side plate 16 and are arranged to engage the above-stated springs 22 and 24 respectively.

A cassette holder 31 is arranged to received the cassette. The holder 31 is pivotally mounted on the chassis 11 and is turnable relative to the chassis 11 on the hinge part 31e thereof. The holder 31 is provided with an aperture 31f which is arranged to receive the above-stated cassette 1. The cassette 1 is thus insertable through this aperture 31f. The holder 31 is also provided with other apertures 31a and 31b which are respectively arranged to permit stabilizing plates 37 and 15 to enter the holder therethrough. The holder 31 is further provided with apertures 31c and 31d which are arranged to allow the spindle 6 and the protrudent part 38a of a leaf spring 38 for pushing the center core to come into the holder 31.

A cassette loading-and-unloading detection lever 66 (see FIG. 5) is provided with a cassette sensing piece 66a. The sensing piece 66a is arranged to come into the holder 31 through a hole 11b of the chassis 11 and another aperture 31g provided in the lower side of the cassette holder 31. An outer cover 35 is pivotally mounted on the chassis 11 at its hinge part 35a and is turnable on the above-stated hinge shaft 12. Lock pins 36a and 36b are erected on the front side surface 35c of the outer cover 35. A hook member 40 is provided on the outer cover for the holder 31. An upper stabilizing plate 37 is attached to the ceiling part of the outer cover 35. A lower stabilizing plate 15 which is disposed on the chassis 11 is arranged to prevent in conjunction with the upper stabilizing plate 37 the vibration and deformation of the magnetic disc 2 from taking place when it rotates by sandwiching it in between them from above and below. These stabilizing plates 37 and 15 are so arranged that a suitable layer of air is formed in between the magnetic disc 2 and each of them. The head 5 is arranged to protrude via an aperture 15a provided in the middle part of the lower stabilizing plate 15. A T-shaped leaf spring 38 is arranged by way of example to have its tail end 38b secured to the ceiling part of the outer cover 35. A fore end part 38a of the leaf spring 38 is formed to protrude downward as shown in the drawing. Edge parts 38c on two sides of the leaf spring 38 are locked against the resilience of the leaf spring 38 by position restricting members 39 which are secured to the ceiling part of the outer cover 35. The protrudent part 38a of the leaf spring 38 is thus arranged to come to the upper part of the spindle 6 under an initial force developed with the edge parts 38c thus locked in position by the position restricting members 39. A spring 13 which is disposed on the hinge shaft 12 has its arm parts abutting on the holder 31 and the outer cover 35 and is thus arranged to impart turning forces to them in the direction of opening the cover 35. Another spring 14 which is also disposed on the hinge shaft 12 has its arm parts abutting on the chassis 11 and the outer cover 35. With the spring 14 arranged in this manner a counterclockwise turning force is exerted on the outer cover 35.

Figure 3C:
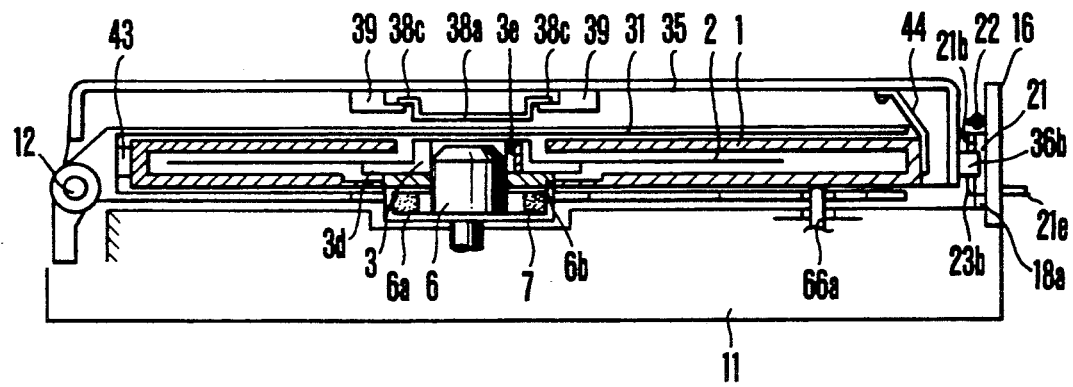
Figure 4A:
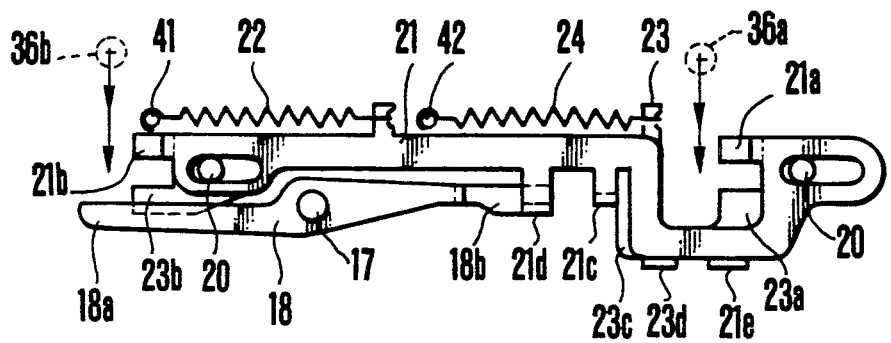
FIGS. 4A, 4B and 4C are plan views showing the details of the cover lock part of the arrangement of FIG. 2 as in its different conditions.
Figure 4B:
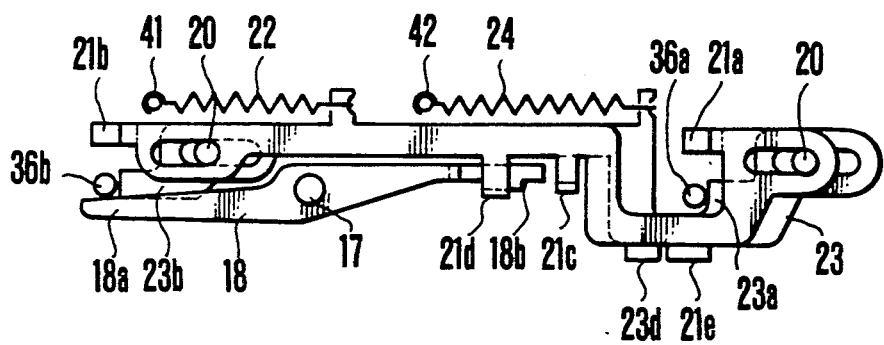
Figure 4C:
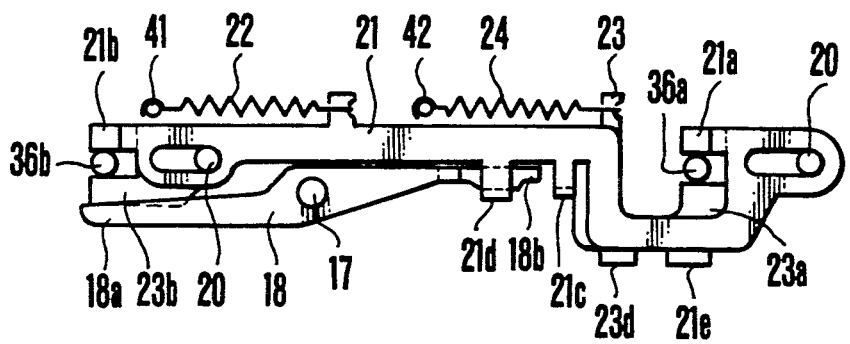

A normally open type outer cover lock completion detecting switch 74 is provided on the chassis 11. Under a condition as shown in FIGS. 3C and 4C, one contact piece 74a of the switch 74 is pushed by the switch control arm 23d of a lock lever 23 and is thus brought into contact with another contact piece 74b of the switch 74.

Figure 5:
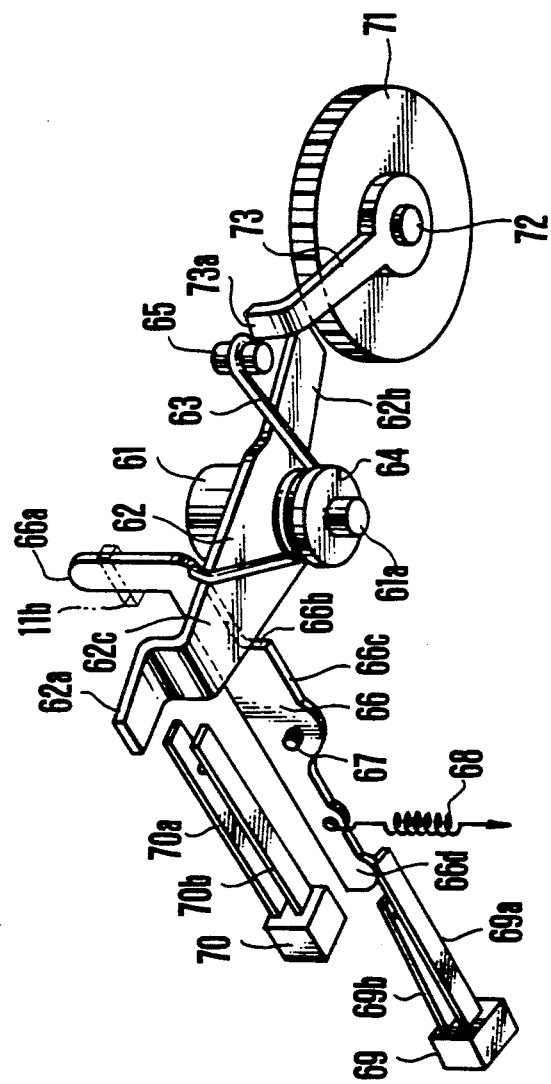
FIG. 5 is an oblique view of the embodiment of this invention showing obliquely from below a device employed in the embodiment of this invention for detecting and memorizing the replacement (loading and unloading) of a cassette.

Referring to FIG. 5, memory means which is arranged according to this invention to mechanically memorize an occurrence of the replacement (loading and unloading) of the cassette 1 is arranged as follows: A lever-pivotally-carrying member 61 is secured to the reverse side of the ceiling plate of the body chassis 11. A switch operating lever 62 is pivotally carried by the shaft part 61a of the member 61 and is arranged to be turnable and rockable on the shaft 61a. The lever 62 is provided with a switch operating part 62a which is formed with the fore end part of the lever bent upward to have the part 62a located above the contact piece 70a of a switch 70 in its neutral position. A spring 63 is arranged to urge the lever 62 to turn counterclockwise as viewed on the drawing and to keep the lever 62 in its neutral position. The spring 63 is wound round the shaft part 61a of the privotally carrying member 61 and has its two ends attached to the lever 62 and a fixed pin 65. The pin 65 is arranged such that, with the tail end 62b of the lever 62 received by the pin 65, the counterclockwise turn of the lever is limited to a point at which the switch operating part 62a comes to be just above the contact piece 70a of the switch 70. A member 64 is arranged to prevent the spring 63 and the lever 61 from pulling out of their positions.

A cassette loading-and-unloading detection lever 66 which is in an L-shape is provided with a cassette sensing piece 66a at the fore end thereof. The lever 66 is pivotally carried by a shaft 67 to be turnable thereon. A spring 68 is arranged to urge the lever 66 to turn in the direction of having the cassette sensing piece 66a come to protrude toward the holder 31 via the hole 11b of the ceiling plate of the chassis 11. The lever 66 is further provided with a bent down part 66b which is arranged to receive the arm part 62c of the switch operating lever 62; a pushing down part 66c for pushing down the arm part 62c; and a switch operating part 66d which is arranged to push down the contact piece 69a of a switch 69.

The switch 69 is of the normally closed type and is arranged to detect the presence or absence of the cassette. In case that the apparatus is not loaded with the cassette 1, the cassette loading-and-unloading detection lever 66 is turned counterclockwise by the force of the spring 68. Then, the switch operating part 66d of the lever 66 pushes the contact piece 69a of the switch 69 to move it away from the other contact piece 69b of the switch. This causes the switch to turn off. When the apparatus is in a state of being loaded with the cassette 1, the sensing piece 66a of the lever 66 is pushed by the lower surface of the cassette 1 to turn clockwise. This brings the contact pieces 69a and 69b into contact with each other by virtue of the force of inertia and thus causes the switch 69 to turn on.

A cassette loading-and-unloading detection switch 70 which is of the normally open type is arranged to turn on when the switch operating part 62a of the switch operating lever 62 pushes down the contact piece 70a of the switch 70 to bring it into contact with the other contact piece 70b of the switch. A gear 71 is arranged to rotate in relation to a shift of the head 5 caused by a head shifting device which will be described later. The gear 71 is rotatably carried by a shaft 72. A reset lever 73 is formed in one unified body with the gear 71. When the head 5 is shifted by the head shifting device to a point located outside of a given recording area on the magnetic disc 2 (whatever the location may be, in the inner part or outer part of the disc 2), the bent up part 73a of the reset lever 73 pushes the tail end 62b of the switch operation lever 62 to move clockwise against the force of the spring 63. This causes the arm part 62c of the lever 62 to move away from the pushing-down part 66c of the cassette loading-and-unloading detection lever 66.

Figure 3A:
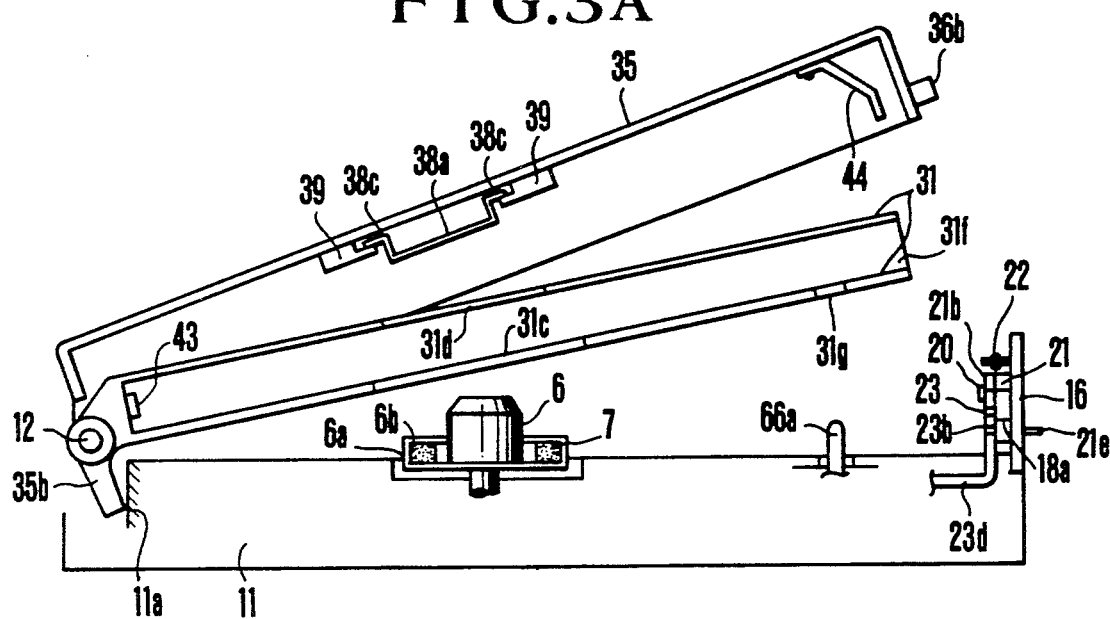
FIGS. 3A, 3B and 3C are sectional views taken along the line A—A of FIG. 2 showing the arrangement of the same embodiment as in different conditions.
Figure 3B:
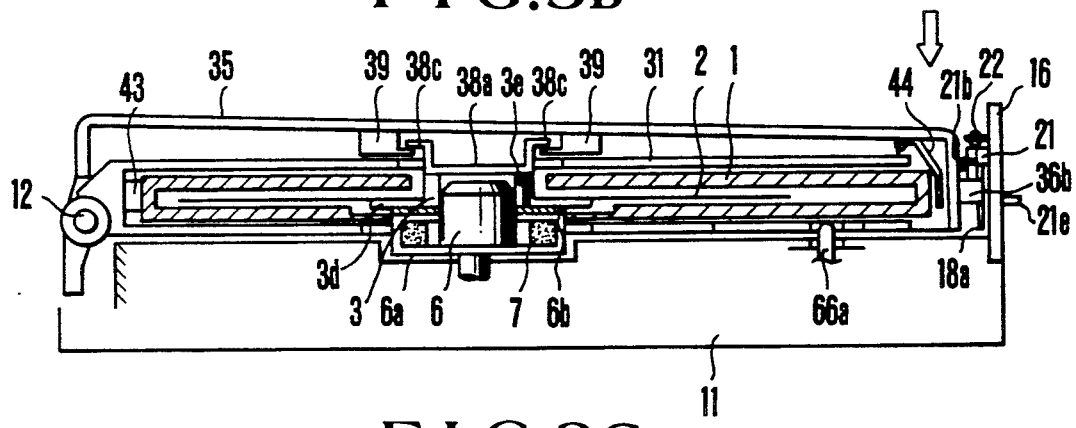

With the embodiment arranged as described above, in loading the apparatus with the cassette, the outer cover 35 is turned counterclockwise relative to the chassis 11 on the hinge shaft 12 against the urging force of the spring 14 as shown in FIG. 3A until one end 35b of the outer cover 35 comes to abut on a chassis wall 11a. In this instance, the urging force of the spring 13 tries to turn the holder 31 clockwise relative to the outer cover 35. However, the hook member 40 which is provided on the outer cover 35 serves to retain the holder 31 in the position as shown in FIG. 3A. Under this condition, the outer cover 35 and the holder 31 are in an open state as shown in FIG. 3A. Referring to FIG. 4A, under this opened condition, the hook part 18b of the clamp lever 18 and the claw part 21d of the lock lever 21 are in a state of engaging each other. The bent part 21c of the lock lever 21 is abutting on one end 23c of the lock lever 23. Accordingly, the two lock levers 21 and 23 are locked in a state of having been shifted to the right against the forces of the springs 22 and 24 respectively. Meanwhile, claw parts 21a and 23a and other claw parts 21b and 23b of these lock levers 21 and 23 are located outside of the moving loci of lock pins 36a and 36b provided on the outer cover 35. Further, under this condition, the contact pieces 74a and 74b of the lock completion detecting switch 74 are out of contact with each other.

Further, referring again to FIG. 5, the cassette loading-and-unloading detection lever 66 is, under this condition, in a state of having been turned counterclockwise by the force of the spring 68. Therefore, the switch operating lever 62 is released from the restriction imposed by the bent dow part 66b of the detection lever 66. This allows the spring 63 to turn the lever 62 counterclockwise until the tail 62b of the lever comes to impinge on the pin 65. The switch operating lever 62 is thus brought into a state in which the switch operating part 62a thereof is located exactly above the contact piece 70a of the cassette loading-and-unloading detection switch 70. Meanwhile, the cassette presence-or-absence detection switch 69 has its contact pieces 69a and 69b out of contact with each other with the contact piece 69a having been pushed down by the switch operating part 66d of the detection lever 66.

Again referring to FIG. 3A, when the cassette 1 is inserted into the holder 31 via the aperture 31f under the condition shown and the outer cover 35 is turned clockwise on the hinge shaft 12 against the urging force of the spring 14, the holder 31 also turns in the same direction on the hinge shaft 12. Under a cassette and disc loading completed condition as shown in FIG. 3C, the spindle 6 comes into the engaging hole 3c of the center core 3 of the magnetic disc 2 via the aperture 31c of the holder 31. The lower stabilizing place 15 and the upper stabilizing plate 37 also respectively come into the apertures 1b and 1a via the apertures 31b and 31a of the holder 31. Then, under that condition, when the outer cover 35 is pushed in further in the direction of arrow as shown in FIG. 3B from the cassette-and-disc loading completed position which is as shown in FIG. 3C, the protrudent fore end part 38a of the leaf spring 38 which is provided on the outer cover 35 urges the center core 3 of the magnetic disc 2 to move toward the spindle 6. The lower surface of the center core 3 thus comes to abut on the flange surface 6b of the flange part 6a of the spindle 6. In this instance, any quantitative difference between the pushing stroke on the outer cover 35 and a necessary extent to which the center core 3 is to be pushed in is absorbed by the flexure of the leaf spring 38.

With the cassette 1 having been inserted into the holder 31, under the condition shown in FIGS. 3B and 3C, the cassette sensing piece 66a of the cassette loading-and-unloading detection lever 66 is under the pressure of the lower surface of the cassette 1. This causes the lever 66 to be moved clockwise against the force of the spring 68. Then, the pushing-down part 66c of the lever 66 pushes the arm part 62c of the switch operating lever 62. In response to this, the switch operation part 62a of the operating lever 62 pushes the contact piece 70a of the cassette loading-and-unloading detection switch 70. The contact piece 70a is thus brought into contact with the contact piece 70b. The switch 70 turns on. Further, the cassette presence-or-absence detection switch 69 is then released from the pushing operation of the switch operation part 66d of the detection lever 66 on its contact piece 69a. Therefore, the switch 69 turns on by virtue of its own force of inertia.

In case that the cassette 1 is not inserted into the holder 31, the detection lever 66 is not turned clockwise. Therefore, both the switches 69 and 70 remain off.

As will be understood from the foregoing description, in the case of this embodiment, removal of the cassette 1 is memorized by the shift of the position of the switch operating lever 62 which takes place when the arm part 62c of the lever 62 turns round until it comes beneath the pushing-down part 66c of the cassette loading-and-unloading detection lever 66. Then, a memory signal representing the cassette removal is obtained in the form of turning on of the cassette loading-and-unloading detection switch 70 which takes place when the holder 31 is loaded with the cassette 1 and is pushed down in that state together with the outer cover 35 to obtain the condition of FIGS. 3B and 3C.

When the outer cover 35 is pushed in as shown in FIG. 3B, the pin 36b which is erected on the outer cover 35 in pair with the lock pin 36a comes to push the tail end 18a of the clamp lever 18. This causes the lever 18 to turn counterclockwise on the shaft 17 against the force of the spring 19. Accordingly, the hook part 18b of the lever 18 is disengaged from the claw part 21d of the lock lever 21. The disengagement allows the lock lever 21 to be moved leftward by the urging force of the spring 22 as shown in FIG. 4B. Then, the claw parts 21a and 21b of the lock lever 21 are respectively positioned above the lock pins 36a and 36b. Further, the side end part of the claw part 23a or 23b of the lock lever 23 then comes to abut sidewise on the lock pin 36a or 36b to prevent the lock lever 23 to be moved leftward by the force of the spring 24 while the other lock lever 21 is moving. After that, when the outer cover 35 is freed frog the pushing-in operation, the urging force of the spring 14 tries to move the outer cover counterclockwise on the hinge shaft 12. However, this is blocked by the engagement of the lock pins 36a and 36b with the claw parts 21a and 21b of the lock lever 21. Further, the lock lever 23 is then caused by the urging force of the spring 24 to move to the left until its movement is restricted by the bent part 21c of the lock lever 21. The claw parts 23a and 23b then comes to engage the lock pins 36a and 36b as shown in FIG. 4C. At this point of time, the outer cover 35 is secured to the body chassis 11. Under this condition, the switch control arm 23d of the lock lever 23 brings the contact piece 74a to the lock completion detecting switch 74 into contact with the other contact piece 74b to turn on the switch. The fore end protrudent part 38a of the leaf spring 38 which is attached to the outer cover 35 comes out of contact with the center core 3. The magnetic disc 2 is thus adequately mounted on the spindle 6 and can be rotated in this state by the rotation of the spindle 6.

In taking out the cassette 1, the bent part 21e of the lock lever 21 which is protruding from a slot-like aperture 16a provided in the side plate 16 is pushed to the right as viewed on FIG. 4C against the forces of the springs 22 and 24. This causes the lock lever 21 to be locked by the clamp lever 18 as shown in FIG. 4A. The lock lever 23 is thus allowed to come back to its original position to open the switch 74. The springs 13 and 14 then act to bring the outer cover 35 and the holder 31 into a state as shown in FIG. 3A.

In FIGS. 3A, 3B and 3C, a reference numeral 43 denotes a positioning member for cassette 1. The member 43 is disposed inside the holder 31 at the bottom thereof. The ceiling part of the outer cover 35 is preferably provided with some suitable means such as a leaf spring 44 or the like which is arranged to push the cassette 1 against the positioning member 43 in response to the closing action of the outer cover 35 in such a manner as to ensure that the cassette 1 is accurately positioned.

In a modification example of the cassette and disc loading arrangement described above, the holder 31 is omitted. In place of the holder 31, a frame of a shape suited to the shape of the cassette 1 is formed as a fixed cassette receiving part within a space in between the hinge shaft 12 of the chassis 11 and the side plate 16 in such a manner as to have the cassette 1 inserted therein. In this instance, the ceiling part of the outer cover 35 is provided preferably with some suitable elastic member such as a leaf spring, a sponge member or a soft rubber member which is arranged to push the cassette 1 against the chassis 11 while the outer cover 35 is in a locked state in such a way as to keep it immovable. Further, in this instance, the apparatus is preferably provided with some suitable eject means which is either manually operatable or is arranged to operate in response to the opening move of the outer cover 35 to eject the cassette 1 from the receiving part of the chassis 11.

Further, in a possible modification of the memory means shown in FIG. 5, only the switches 69 and 70 and the gear 71 are disposed on the side of the body chassis. The operating lever 62 and the detection lever 66 are disposed on the reverse side of the holder 31 while they are arranged in the same manner as in the case of FIG. 5. The cassette sensing piece 66a of the detection lever 66 is arranged to enter the holder 31 via the aperture 31g of the holder 31. The levers 66 and 62 are thus arranged to be operatable on the switches 69 and 70 when the holder 31 and the outer cover 35 are set in the states of FIGS. 3B and 3C. Meanwhile, the reset lever 73 is operatable on the lever 62 under that condition.

Figure 6:
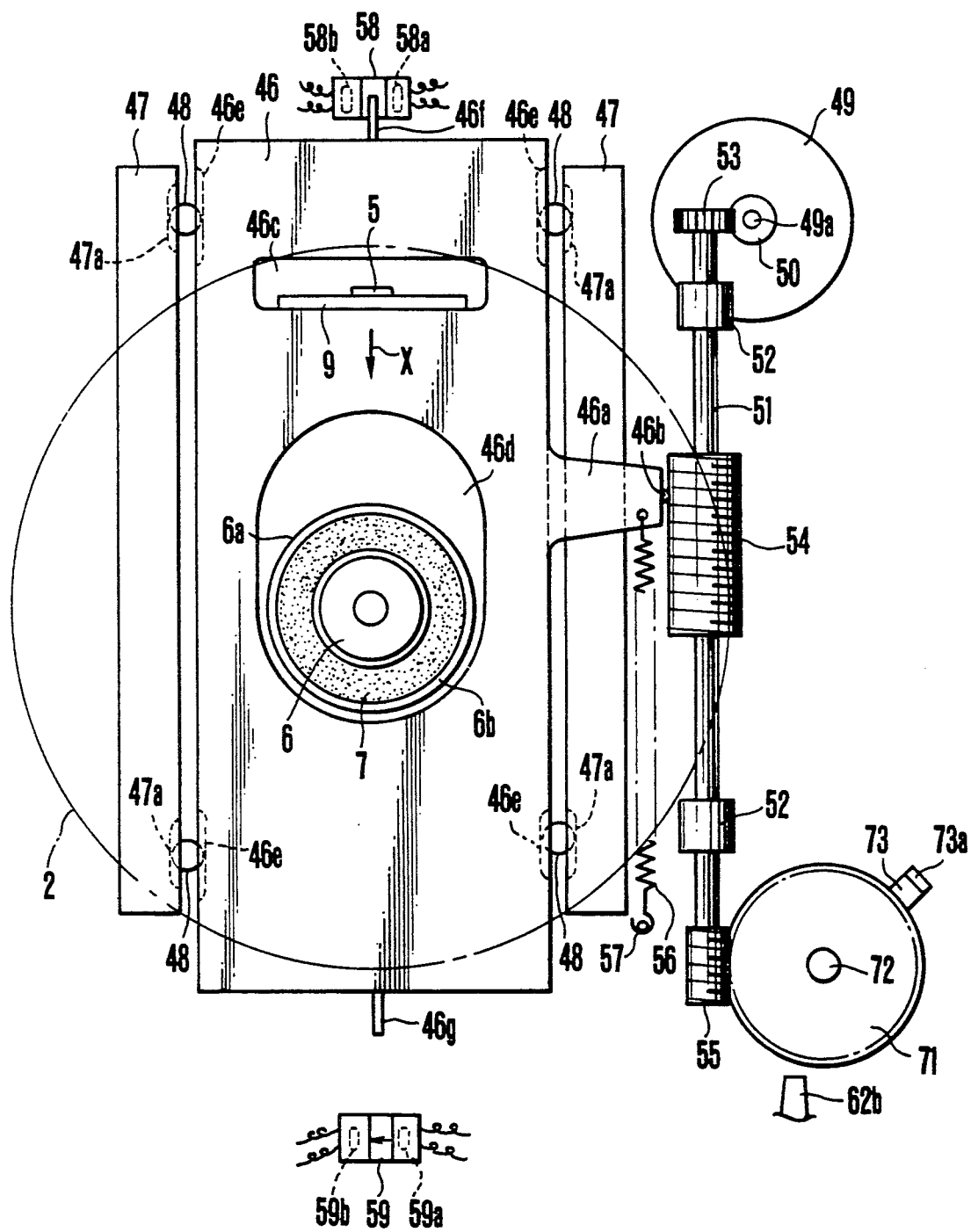
FIG. 6 is a plan view of the embodiment of this invention showing a head shifting device employed in the embodiment.

The details of the magnetic head shifting device are as shown in FIG. 6. The magnetic head 5 is secured to a slot part 46c of a head carrier 46 via a head mount base plate 9. The head carrier 46 is carried via sliding balls 48 by guide rails 47 and is slidable along the guide rails 47.

The balls 48 are placed in V-shaped grooves 46e and 47a formed in the side parts of the head carrier 46 and in the guide rails 47. A slot 46d is formed in the head carrier 46 for the purpose of escaping from the spindle 6. An engaging part 46b is arranged at the fore end of an arm part 46a of the head carrier 46 to engage a head shifting screw 54. A back-lash removing spring 56 is disposed in between the arm part 46a and a fixed pin 57. The spring 56 urges the head carrier 46 to move in the direction of arrow X, which is downward as viewed on the drawing. This arrangement removes any bakc-lash of engagement between the engaging part 46b and the screw 54. The screw 54 is mounted on the middle part of a shaft 51. The shaft 51 is rotatably carried by a bearing 52. A worm wheel 53 and a worm gear 55 are mounted on both ends of the shaft 51. The worm wheel 53 engages a worm gear 50 which is mounted on the output shaft 49a of a stepper motor 49 for shifting the head. The worm gear 55 engages the gear 71 which is also shown in FIG. 5.

When the stepper motor 49 rotates, the rotation is transmitted via the engagement of the worm gear 50 and the worm wheel 53 to the shaft 51. The screw 54 is rotated by this. The head carrier 46 is then moved via the engagement of the engaging part 46b thereof and the screw 54 according to the lead of the screw. In this case, the moving direction of the carrier 46 is controllable by the rotating direction of the motor 49. The head shifting extent for a unit track pitch on the disc 2 is controllable by the number of rotation steps to be taken by the motor 49. In this case, the gear 71 is of course driven to rotate via the worm gear 55.

Detectors 58 and 59 are respectively arranged to detect the deviation of the position of the head 5 from a given recording area on the disc 2 toward the outer side and the inner side of the disc. These detectors 58 and 59 are provided with light emitting elements 58a and 59a and light receiving elements 58b and 59b to form known photo-couplers. These photo-couplers are thus arranged to detect light shielding plates 46f and 46g which are attached to the carrier 46.

In the embodiment described, a total of 50 recording tracks can be formed in a predetermined recording area on the disc 2 at a predetermined track pitch, say, 100 μm. It is assumed that these tracks are numbered 1 to 50 from the peripheral side toward the center of the disc 1. In This instance, the detector 58 is arranged to detect the light shielding plate 46f when the head 5 is shifted to a point located at a one-track pitch distance further toward the peripheral side of the disc from the first track position (hereinafter expediently referred to as the No. 0 track position). Meanwhile, the other detector 59 is arranged to detect the light shielding plate 46g when the head 5 is shifted to a point located at a one-track pitch distance from the fiftieth track position further toward the middle of the disc (hereinafter expediently referred to as the 51st track position). The gear 71 is arranged to turn clockwise (counterclockwise in the case of FIG. 5) when the carrier 46 is moved in the direction of arrow X and to turn counterclockwise (clockwise in the case of FIG. 5) when the carrier 46 is moved in the direction reverse to the arrow X. With the gear 71 rotated, the bent-up part 73a of the reset lever 73 comes to push the tail end 62b of the switch operating lever 62 when, for example, the head 5 is shifted to an extent of five track pitches further toward the middle part of the disc from the 51st track position. Then, the arm part 62c of the lever 62 is disengaged from the pushing-down part 66c of the detection lever 66. Further, the head carrier 46 is arranged to be shifted in the direction of arrow X by the forward rotation of the stepper or stepping motor 49 and in the reverse direction by the reverse rotation of the motor 49.

Figure 7:
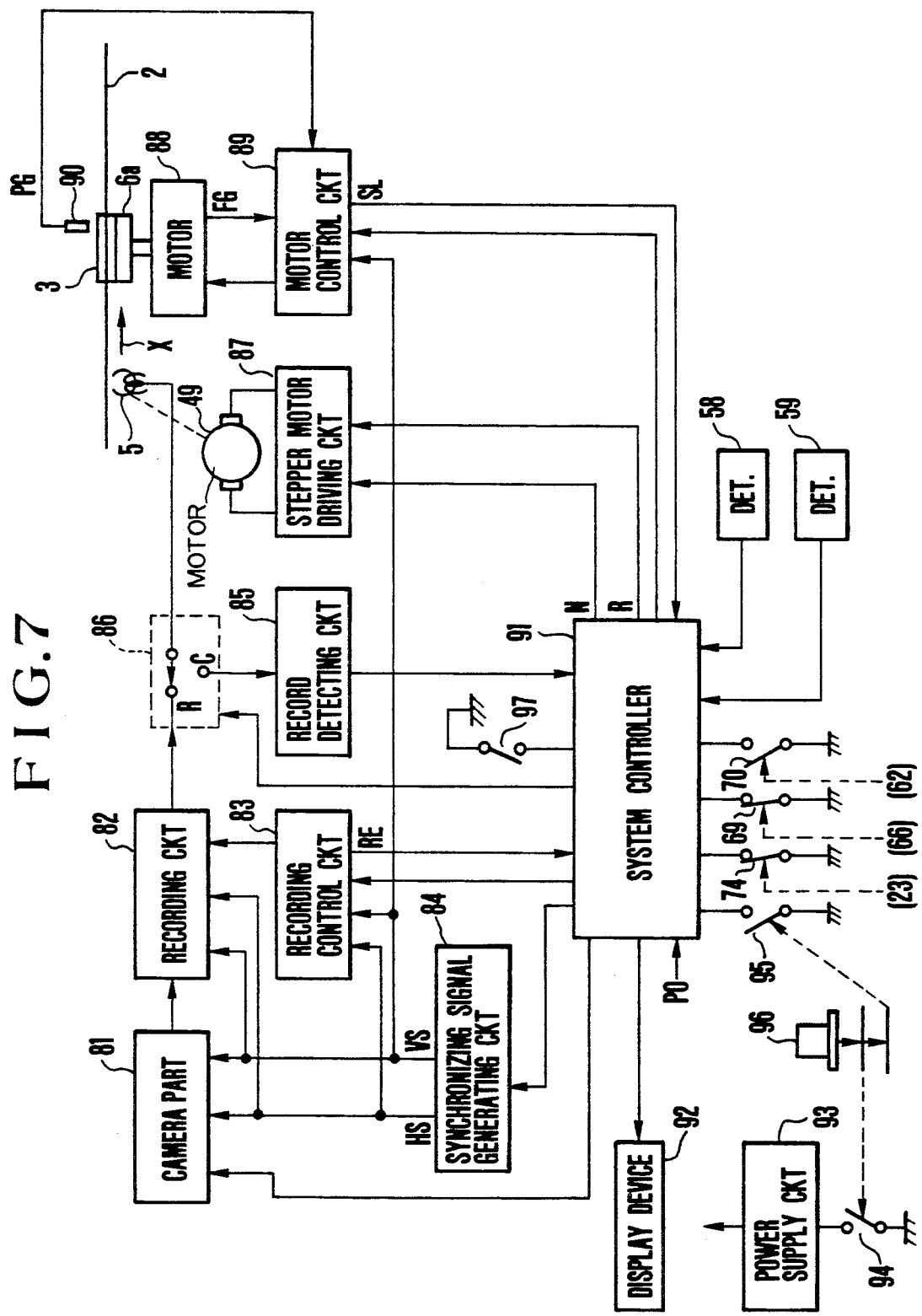
FIG. 7 is a block diagram showing the electric circuit arrangement of the embodiement of this invention.

While the mechanical arrangement of the recording apparatus according to this invention is as described in the foregoing, the electrical circuit arrangement of this embodiment is as follows: FIG. 7 shows by way of example the circuit arrangement of a still video recording apparatus embodying this invention. A camera part 81 is arranged in a known manner to form a video signal. A recording circuit 82 is arranged to record the video signal coming from the camera part 81 on the disc 2 via the head 5. A recording control circuit 83 is arranged to cause the recording circuit 82 to record one field or one frame portion of the video signal. A synchronizing signal generating circuit 84 is arranged to generate horizontal and vertical synchronizing signals HS and VS. The output of the circuit 84 is arranged to be supplied to the camera part 81, the recording circuit 82, the recording control circuit 83 and a disc motor control circuit 89 which will be described later. Further, the recording control circuit 83 is arranged to produce a recording end signal RE upon completion of recording by the head 5.

A record detecting circuit 85 is arranged to detect through the head 5 whether there is any record or no record of a video signal at each recording position on the disc 2. A change-over switch 86 is arranged to switch the connection with the head 5 between the output terminal of the recording circuit 82 (one terminal R of the switch) and the input terminal of the detecting circuit 85 (another terminal C of the switch).

A stepper motor driving circuit 87 is arranged to drive the stepper motor 49 which is used for shifting the head as shown in FIG. 6. A motor 88 is arranged to cause the disc 2 to rotate via the spindle 6. A disc motor control circuit 89 is arranged to control the disc rotating motor 88 and includes therein a reference oscillator which produces a reference speed signal. The circuit 89 controls the motor 88 on the basis of the reference speed signal, a rotation speed signal FG obtained from the motor 88, the vertical synchronizing signal VS from the synchronizing signal generating circuit 84 and a disc rotation phase signal PG from a disc rotation phase detector 90 which detect the magnetic pin 3e buried in the center core 3. The motor 88 is thus controlled to rotate the disc 2 at a predetermined speed corresponding either to the field or frame frequency of television, i.e. at 3,600 or 1,800 rpm in the case of the NTSC system, and at a predetermined phase relative to the timing of the vertical synchronizing signal VS. Further, the control circuit 89 produces a servo-lock-in signal SL when the motor 88 comes to rotate both at the predetermined speed and at the predetermined phase.

A system controller 91 is arranged to control the whole circuit arrangement of FIG. 7 according to the output of a recording trigger switch 95; that of the above-stated cassette presence-or-absence detection switch 69; that of the cassette loading-and-unloading detection switch 70; that of the outer cover lock completion detecting switch 74; those of the carrier position detectors 58 and 59; the recording end signal RE from the recording control circuit 83; the servo-lock-in signal SL; and a power-on signal PO which is obtained when the power supply is switched on.

A display device 92 includes either light emitting or sound producing elements. A power supply circuit 93 includes a battery. The circuit arrangement includes a power supply switch 94; a recording trigger switch 95; and a trigger button 96. In this specific embodiment, the trigger button 96 is arranged to cause the power supply switch to turn on when the button is pushed down to a first step and to cause the recording trigger switch 95 to turn on when it is pushed further down to a second step.

A mode change-over switch 97 is provided for switch-over between a single photo-taking mode in which one field or one frame portion of the signal is recorded per operation of the trigger switch 95 and a continuous photo-taking mode in which recording is continuously repeated at a given speed as long as the trigger switch 95 remains in an ON state. The switch turns off for selection of the single photo-taking mode and turns on for the continuous photo-taking mode.

Further, it goes without saying that the trigger button 96 may be arranged to be used only for operating the trigger switch 95 while the power supply switch 94 is arranged to be operated by some other memeber.

In case that the recorded signal is an FM signal, the record (presence-or-absence) detecting circuit 85 is arranged to detect the presence or absence of a radio frequency (RF) signal and to produce a high level signal in the event of the presence of the signal.

Figure 8:
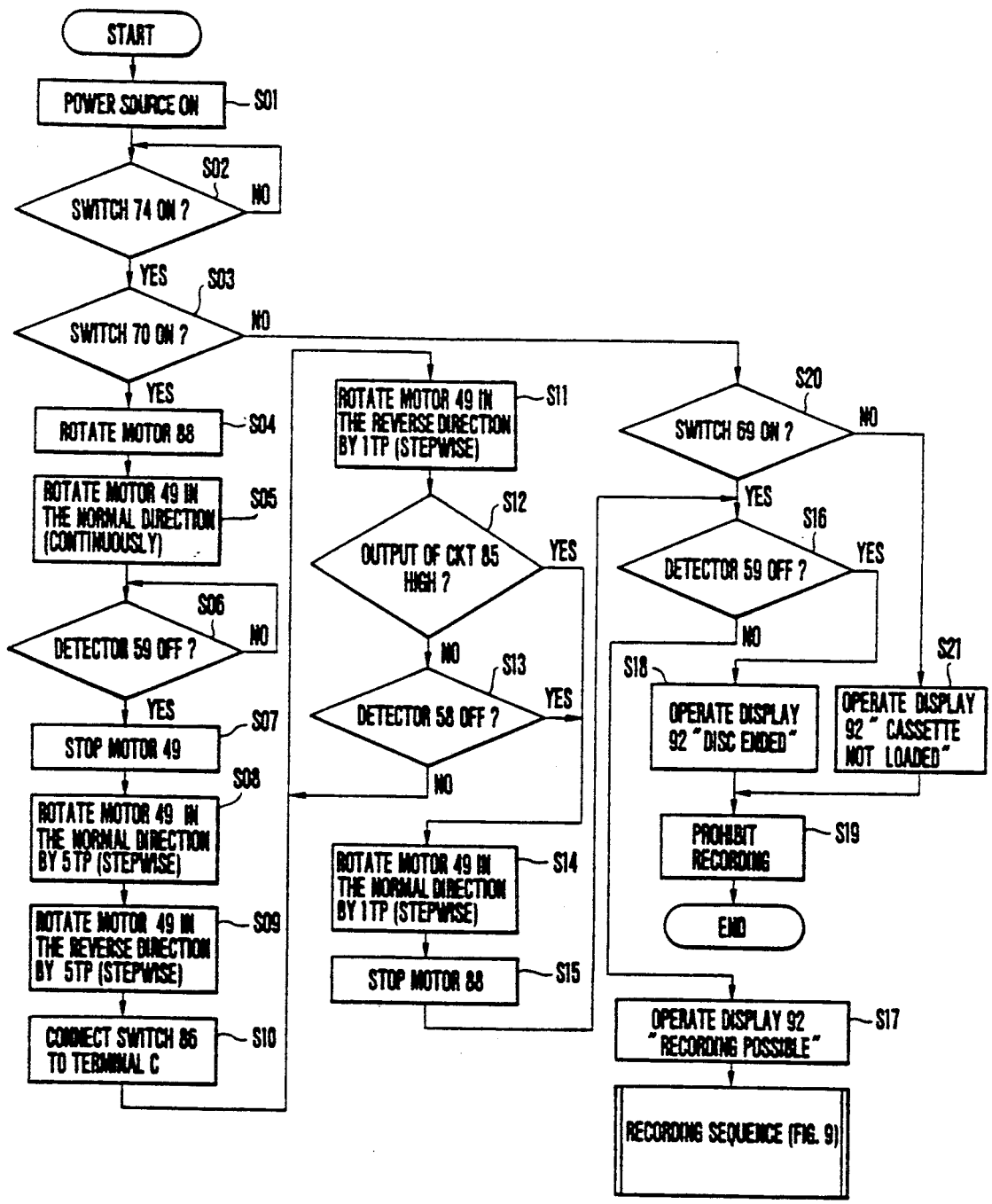
FIG. 8 is a flow chart showing the control operation of a system controller of FIG. 7 to be performed in preparation for recording.

The system controller 91 is principally composed of a micro-computer, etc. The operation of the system controller 91 is as described below with reference to flow charts:

Referring to FIG. 8, with the trigger button 96 pushed down to its first step to turn on the power supply switch 94, an operation to make preparations for recording is performed as shown in FIG. 8. With the power supply switched on (at step S01), the system controller 91 checks the outer cover lock completion detecting switch 74 to find whether it is on (at a step S02). If it is found not on as yet, the controller waits until it turns on. If it is found on, the controller 91 checks the cassette loading-and-unloading detection switch 70 to find whether it is on (at a step S03). If this switch is found on, it indicates that the cassette 1 has been replaced (loaded and unloaded). In this case, an automatic positioning operation is performed on the head 5 to bring it to an unrecorded part on the disc 2.

If the head 5 is shifted while the disc 2 is in repose, the recording surface of the disc 2 would be damaged. To prevent this, the controller 91 instructs the disc motor control circuit 89 to start the motor 88. The motor 88 is thus caused to rotate (at a step S04). Following that, the stepper motor driving circuit 87 is instructed to cause the stepper motor 49 to continuously rotate forward. The motor 49 comes to continuously rotate forward (at a step S05). As a result of this, the head 5 is continuously shifted toward the middle part of the disc 2, i.e. in the direction of arrow X as shown in FIG. 7. During this process, the controller 91 checks, in a repeating manner, the position of the carrier position detector 59 to find whether its light receiving element 59b is turned off by the light shielding plate 46g of the carrier 46 (see FIG. 6) as a result of arrival of the head 5 at the 51st track position (at step S06). When the light receiving element 59b of the detector 59 turns off, the controller instructs to stop the motor 49 (step S07). Immediately after that, the controller 91 instructs the driving circuit 87 to have the motor 49 make stepwise forward rotation to shift the head 5 further in the direction of arrow X to an extent corresponding to five track pitches (hereinafter will be called TP's for short) (step S08). In response to this, the reset lever 73 of FIG. 5 causes the switch operating lever 62 to turn clockwise as viewed on FIG. 5. The arm part 62c of the lever 62 then disengages from the pushing-down part 66c of the cassette loading-and-unloading detection lever 66. This brings the cassette loading-and-unloading detection switch 70 back to its OFF state. Meanwhile, the spring 63 acts on the switch operating lever 62 to bring it back to its neutral state in which its arm part 62c can abut on the bent-down part 66b of the detection lever 66. After that, therefore, the operating lever 62 abuts on the bent-down part 66b of the detection lever 66 even it is freed from the pressure of the reset lever 73 and thus does not act on the switch 70.

After the stepper motor 49 is caused to make stepwise forward rotation to an extent corresponding to 5 TP's, the controller 91 instructs the driving circuit 87 to have the same motor 49 make stepwise reverse rotation to shift the head 5 to the extent of 5 TP's in the direction reverse to the direction of arrow X (step S09). As a result, the head 5 is positioned at the 51st track on the disc 2.

Following this, the controller 91 connects the change-over switch 86 to its terminal C (step S10). Under that condition, the controller instructs the driving circuit 87 to have the motor 49 make stepwise reverse rotation to shift the head 5 to an extent corresponding to 1 TP in the direction reverse to the arrow X (step S11). The head 5 is thus positioned at the 50th track on the disc. Under this condition, the record detecting circuit 85 is connected via the change-over switch 86 to the head 5. The detecting circuit 85, therefore, detects whether there exists any signal previously recorded in the 50th track on the disc 2 according to a signal picked up by the head 5. In the event of the presence of any recorded signal there, the circuit 85 produces a high level signal. If no signal is detected there, it produces a low level signal. The controller 91 checks the output of the detecting circuit to find whether it is at a high level (step S12). If it is not at a high level, the controller checks the carrier position detector 58 to find whether the light receiving element 58b thereof has been turned off (step S13). If not, the operation of the controller comes back to the step S11 to instruct again to have the motor 49 make its stepwise reverse rotation in the direction reverse to the arrow X to shift the head 5 to an extent corresponding to 1 TP. In this manner, the processes of the steps S11, S12 and S13 are repeated until either the output level of the detector 85 becomes high or the element 58b of the detector 58 turns off. When either the output level of the detection circuit 85 becomes high or the element 58b turns off, the controller 91 instructs to have the motor 49 make its stepwise forward rotation to shift the head 5 to the extent of 1 TP (step S14), because: The change of the output level of the detection circuit 85 to a high level indicates that the head 5 has reached the last of recorded tracks with these tracks counted in the sequence of the recording track numbers on the disc 2. Accordingly, when the operation of the controller 91 comes to the step S14, the head 5 is positioned at an unrecorded track position located next to the last recorded track. (In other words, in this particular instance, some of the recording tracks on the disc 2 have already been recorded.) Meanwhile, turning off of the element 58b of the detector 58 indicates arrival of the head 5 at the No. 0 track position on the disc 2. Therefore, in this instance, with the operation coming from the step S13 to the step S14, the head 5 is set at the first track position, that is, this indicates that the disc 2 has not been recorded.

With the head 5 thus having been set at an unrecorded track position immediately following the last recorded track, the controller 91 issues an instruction for bringing the disc motor 88 to a stop (at a step S15). The controller 91 then checks the detector 59 to see if it is in an OFF state (at a step S16). If not, the display device 92 is caused to make a display indicating that recording can be performed (or indicating completion of preparations for recording), at a step S17. In the event of the OFF state of the detector 59, the controller has the display device 92 make a display indicating completion of recording in all the recording positions on the disc 2 (at a step S18). Recording is inhibited (at a step S19).

At the preceding step S03, if the cassette loading-and-unloading switch 70 is found not ON, it indicates either that the cassette 1 has not been replaced or that the recording apparatus is not loaded with the cassette 1. Such being the case, the controller 91 checks if the cassette (presence-or-absence) detection switch 69 is ON (step S20). In the event that the switch 69 is on indicating that the cassette 1 has not been replaced, the operation of the controller 91 shifts to be previous step S16. In case that the switch 69 is found not ON thus indicating that the apparatus is not loaded with the cassette 1 (absence of the cassette), the controller 91 has the display device 92 make a display indicating this (at a step S21) and inhibits recording (step S19).

This embodiment thus makes preparations for recording in the manner as described above.

Figure 9:
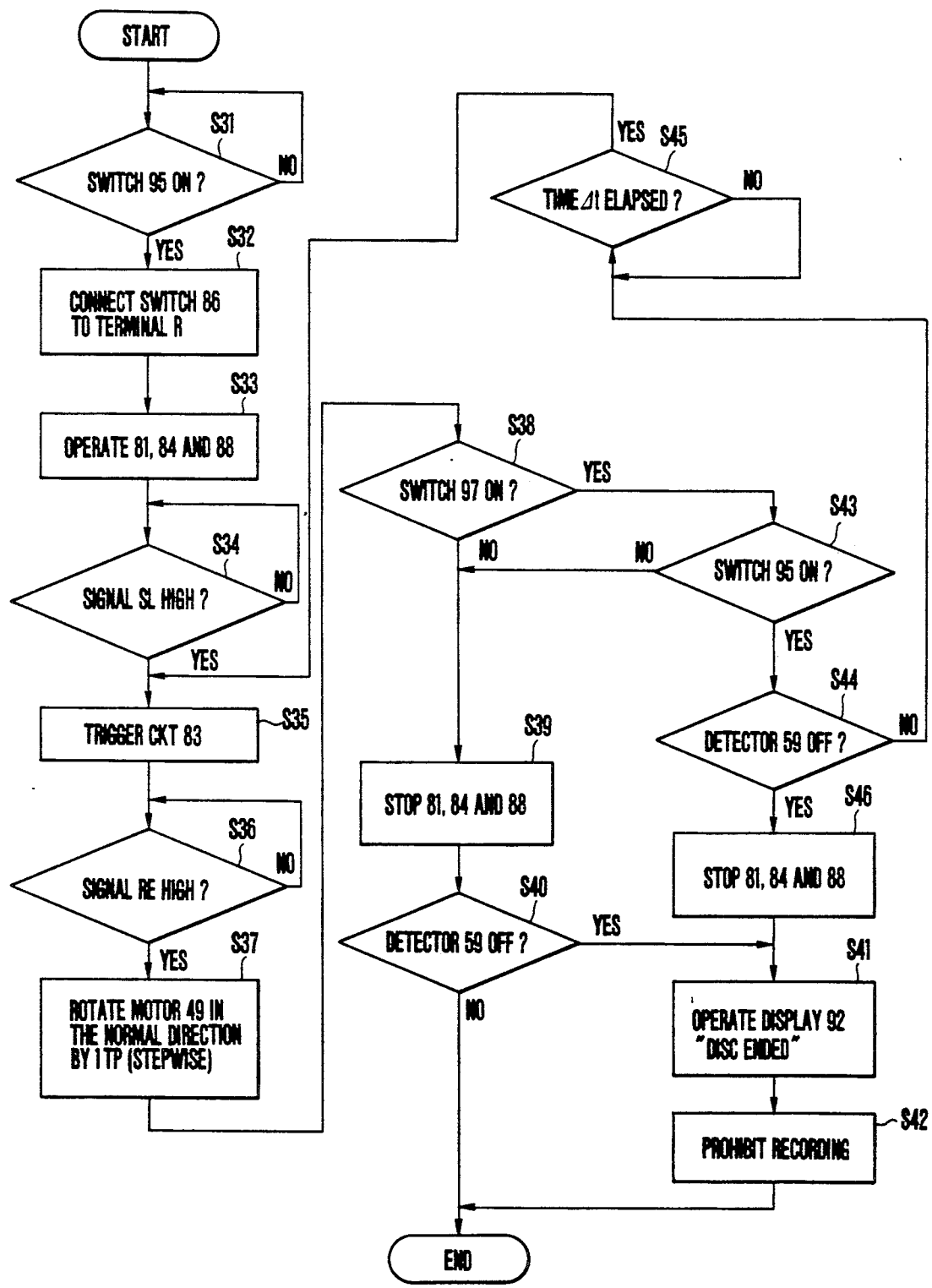
FIG. 9 is a flow chart showing the control operation of the same system controller to be performed in carrying out a recording operation.

Referring not to FIG. 9, after completion of the preparations for recording, a recording operation on a video signal which is initiated by turning on the recording trigger switch 95 and is performed in the following manner: As long as the power supply is not switched off after completion of the preparations for recording, the system controller 91 checks, in a repeating manner, the recording trigger switch 95 to see if it has been turned on by a depressing operation on the trigger button 96 down to its second step (at a step S31). When the trigger switch is turned on, the controller 91 shifts the connecting position of the change-over switch 86 to the terminal R thereof (at a step S32). Following this the camera part 81 and the synchronizing signal generating circuit 84 are actuated. At the same time, the motor control circuit 89 is instructed to rotate the disc motor 88 (at a step S33). As a result, the camera part 81 comes to produce a video signal in synchronism with the synchronizing signals HS and VS coming from the synchronizing signal generating circuit 84. The recording circuit 82 then processes the video signal obtained from the camera part 81 by performing frequency modulation, etc. to make it into a recording signal. Under this condition, a recording gate which is included in the recording circuit 82 is in an OFF state. Therefore, although the recording circuit 82 is connected via the change-over switch 86 to the head 5, no recording is performed under this condition. Meanwhile, the motor control circuit 89 controls the rotation of the motor 88 to have the disc 2 rotated at a speed corresponding to the field or frame frequency and at a phase in a predetermined relation to the vertical synchronizing signal VS. This control is performed on the basis of the speed signal FG from the motor 88, the rotation phase signal PG from the rotation phase detector 90 and the vertical synchronizing signal VS from the circuit 84. When the motor 88 comes to rotate at the controlled speed and at the controlled phase, the level of the servo-lock-in signal SL becomes high. Meanwhile, the controller 91 produces an instruction to operate the motor 88. After that, it repeats checking the servo-lock-in signal SL which comes from the control circuit 89 to see if the level of the signal has become high (at a step S34). When the level of the servo-lock-in signal SL becomes high, the recording control circuit 83 is immediately triggered for recording (at a step S35). Upon receipt of the recording trigger signal, the circuit 83 causes, on the basis of the synchronizing signals HS and VS from the synchronizing signal generating circuit 84, the recording gate of the recording circuit 82 to turn on for either one field or one frame period including the vertical synchronizing signal VS first received immediately after receipt of the recording trigger signal. As a result, a one-field or one-frame portion of a recording signal is supplied via the change-over switch 86 to the head 5. The recording signal is then recorded on the disc 2 while the disc 2 is caused by the motor 88 to make just one turn. In that instance, the vertical synchronizing signal VS is of course recorded at a predetermined rotation point relative to the magnetic pin 3e of the center core 3. Upon completion of recording the one-field or one-frame portion of the recording signal performed in this manner, the recording control circuit 83 changes the level of the recording end signal RE to a high level. Meanwhile, after the recording triggering action, the controller 91 has been repeatedly checking the recording end signal RE to see whether the level of this signal has become high (step S36). When the level of the signal RE becomes high, the controller instructs the motor driving circuit 87 to cause the stepper motor 49 to make stepwise forward rotation to shift the head 5 to a next recording position, that is, to shift it to the extent of 1 TP in the direction of arrow X (step S37). Following this, the controller 91 checks the mode change-over switch 97 to see if it has turned on (at a step S38). If it is found not on (indicating selection of the single photo-taking mode), the controller 91 stops the camera part 81 and the synchronizing signal generating circuit 84 from operating. It also instructs the motor control circuit 89 to bring the rotation of the disc motor 88 to a stop (at a step S39). After that, the controller 91 checks the detector 59 to see if it has been turned off by the shift of the head 5 (at a step S40). If it is found to have been turned off, the controller 91 causes the display device 92 to make a display indicating completion of recording on the disc (at a step S41). Then, further recording is inhibited (at a step S42).

After this, in the case of designation of the single photo-taking mode with the switch 97 in an OFF state, one field or one frame position of the signal is recorded through the same processes as those described above in each of different recording positions on the disc 2 every time the recording trigger switch 95 is turned on until the detector 59 comes to turn off.

Whereas, in the event that the mode change-over switch 97 is found in an ON state at the step S38 (thus indicating the selection of the continuous photo-taking mode), the controller 91 checks the trigger switch 95 to see if it has been turned on by then (at a step S43). If not, the operation shifts to the step S39. If it is found to have been turned on, the controller checks the detector 59 to see if it is in an OFF state (at a step S44). If not, the controller waits for the lapse of a given period of time Δt provided for determining the speed or rate at which a continuous recording is to be carried out (at a step S45). After the lapse of this period of time, the operation comes back to the step S35 and a triggering action is performed for recording. In the event that the detector 59 is found in an OFF state at the step S44, the controller 91 brings the operations of the camera part 81 and that of the synchronizing signal generator 84 to a stop in the same manner as at the step S39 and at the same time instructs to bring the rotation of the motor 88 to a stop (at a step S46). After that, the operation shifts to the step S41.

In case that the switch 97 is on and the continuous photo-taking mode is thus designated, the processes described in the foregoing are performed to have one field or one frame portion of the video signal continuously recorded in each of different positions on the disc 2 at a given speed one after another as long as the recording trigger switch 95 is in its ON state until the detector 59 turns OFF.

Further, in this instance, the speed or rate at which the continuous photo-taking operation is to be performed is adjustable as desired by changing the waiting period of time Δt at the step S45.

In accordance with the arrangement of this embodiment as described in the foregoing, in positioning the head 5 in a recording position on the disc 2 during the operation to be performed in preparation for recording, the presence or absence of a previous record is examined for each of recording positions on the disc 2 one by one beginning with the 50th recording track which is the last recording position on the disc 2 in the order reverse to the sequence in which the tracks are numbered for recording. This checking process is performed until a track is found recorded for the first time. Then, the head 5 is positioned at a point located at the distance of 1 TP backward from the recording track first found recorded. In other words, the head 5 is arranged to be positioned in an unrecorded track just following the last of recorded tracks counting in the numbering sequence of recording tracks. Therefore, even in case where only a portion of the disc 2 has been used for recording and a record in some of the intermediate tracks has been erased, the above-stated arrangement of the embodiment prevents the head 5 from being positioned for that erased track. Accordingly, any inconvenience that possibly results from a recording operation on that erased track can be eliminated. Such inconvenience, for example, includes: The necessity for making a discrimination between the presence and absence of a record in each of the shifted positions of the head 5 every time the head is shifted to a next recording position after recording on the erased track. It necessitates a long time before a next recording process becomes possible and then would result in missing a good recording opportunity. Besides, it becomes hardly possible to adequately carry out a continuous recording operation.

The arrangement to mechanically storing information on the replacement (loading and unloading) of the cassette, as shown in FIG. 5, enables the apparatus to know without fail whether or not the cassette has been replaced under a condition of having no power supply. Then, in recording, the operation can be adequately performed accordingly without wasting the electric energy by unnecessarily readjusting the head 5 to an unrecorded part. The waste of the electric energy in this manner presents a serious problem particularly in the case of a portable type apparatus using a battery as a power source. It is another advantage of the embodiment that the possibility of missing a good recording opportunity (a shutter chance in the case of a camera) can be eliminated by the arrangement thereof. The embodiment thus can be arranged into a rationalized system.

MODIFICATION EXAMPLE

Further to the modification example mentioned in the foregoing, the memory means shown in FIG. 5 may be changed in the following manner as another modification example: The cassette loading-and-unloading detection lever 66 is arranged to detect the loading and unloading of the cassette 1 by detecting the opening action of the holder 31 or that of the outer cover 35 (the condition as shown in FIG. 3A) instead of detecting the presence of the cassette 1 within the holder 31. In the case of the former, the aperture 31g of the holder 31 is closed and the sensor piece 66a of the lever 66 may be arranged to detect the bottom surface of the holder 31. In the case of the latter, the sensor piece 66a may be arranged to detect the edge of the outer cover 35 or the hook 40 (see FIG. 2). However, in either case, the function of the cassette presence-or-absence detection switch 69 would be affected without some modification. Therefore, the switch 69 should be modified to be of a normally open type and to be operatable independently of the detection lever 66. A detection pin or the like is secured to the upper contact piece (corresponds to 69b) of the switch 69 and is arranged to be capable of entering the inside of the holder 31 through the ceiling plate of the chassis 11 and an opening provided in the lower side of the holder 31. With the holder 31 and the outer cover 35 closed, this pin is thus arranged to be pushed to bring the contact pieces (69b and 69a) of the switch 69 into contact with each other only when the cassette 1 is present within the holder 31. In this instance, the system controller 91 is arranged to perform its control operation in preparation for recording in a manner as shown in a flow chart in FIG. 10. The control operation shown in FIG. 10 only partly differs in the sequence of steps from the flow chart of FIG. 8 while the process of each step remains unchanged. More specifically, the checking action performed at the step S20 for finding the presence or absence of the cassette when that the cassette loading-and-unloading switch 70 is found not ON at the step S03 of FIG. 8 is changed to be performed, in this instance, between the step S02 of checking for ON of the outer cover lock completion detecting switch 74 and the next step S03.

In a further modification example, the resetting action on the switch operating lever 62 is arranged to be performed independently of the shift of the head 5. More specifically, the arrangement of the gear 71 and the reset lever 73 of FIGS. 5 and 6 is replaced with a suction solenoid or a rod thrusting type plunger which is arranged close to the tail end 62b of the lever 62 to be energized by the controller 91, for example, in parallel with the step S04 or S15 of FIGS. 8 and 10. In this case, the lever 62 is thus arranged to be caused to turn round clockwise as viewed on FIG. 5 by the suction of the solenoid or the thrusting force of the plunger rod.

Figure 10:
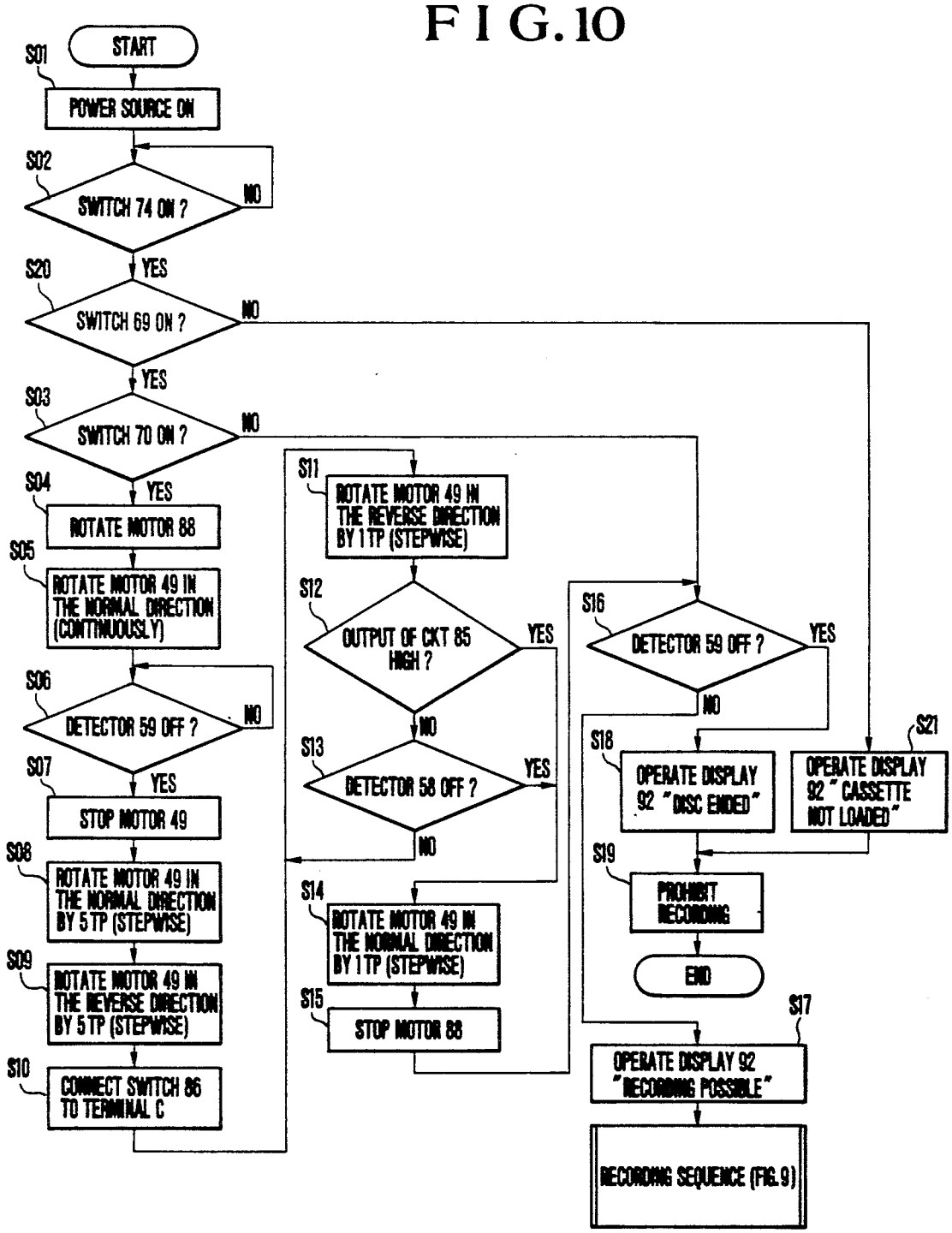
FIG. 10 is a flow chart showing the control operation of a system controller performed in preparation for recording in a modification of the embodiment of the invention mentioned above.

In the embodiment and modifications thereof described, the recording tracks on the disc 2 are numbered in the sequence from the peripheral side of the disc to the central side thereof. However, the numbering order may be reversed to make it from the central side to the peripheral side of the disc. In that event, the flow of the operation shown in FIGS. 8 to 10 is also somewhat modified accordingly.

In the foregoing, a still video recording apparatus of the kind having the camera part arranged in one unified body therewith is described by way of example. However, the camera part 81 may be separately arranged. In the embodiment, the battery is employed as the power source for the recording apparatus. The use of the battery may be replaced with a commercial power supply.

What is claimed is:

1. A head accessing method for a recording apparatus arranged to shift a recording head in a direction transverse to tracks formed on a record bearing medium and to permit the head to perform recording on each track of said record bearing medium, comprising:
   a step of discriminating an exchange of said record bearing medium relative to said recording apparatus while main power of said recording apparatus is shut down, discrimination being effected by taking off and insertion of said record bearing medium;
   a step of instructing a detection of a recording condition of said record bearing medium, depending upon the exchange of said record bearing medium discriminated in said discriminating step;
   a step of detecting presence or absence of a record in at least a part of said tracks of said medium by detecting whether there is any record or no record at the track to be detected one after another in sequence in a direction reverse to said direction from a given position; and
   a step of accessing said head at a point determined by shifting it one track in said transverse direction from a track where the presence of a record is first detected by said detecting step.

2. A method according to claim 1, wherein said detecting step detects the presence or absence of a record on the tracks formed on the record bearing medium which is a disc-like recording medium.

3. A method according to claim 2, wherein said detecting step detects the disc-like recording medium from an outermost periphery toward an inner periphery, in sequence.

4. A method according to claim 1, further comprising a step of performing recording on the track accessed in said accessing step following said accessing step.

5. A recording apparatus arranged to shift an access track of a recording head in a given direction relative to a record bearing medium and to perform recording in each shifted position, comprising:
   a) discriminating means for discriminating an exchange of said record bearing medium relative to said recording apparatus while main power of said recording apparatus is shut down, discrimination being effected by taking off and insertion of said record bearing medium;
   b) detecting means for detecting a presence or absence of a record in a given track on said medium by detecting whether there is any record or no record at the given track, depending upon the exchange of said record bearing medium discriminated by said discriminating means;
   c) means for controlling said detecting means such that the track to be detected by said detecting means is shifted every one track in a direction reverse to a given direction from a given position; and
   d) access means for accessing said recording head to a track deviated in said given direction one track from a track first detected to have a record thereon by said detecting means when such detection is made during the sequential shifting of the tracks by said controlling-means.

6. An apparatus according to claim 5, wherein said detecting means includes:
   a) means for reproducing signals recorded on said tracks of said medium.

7. An apparatus according to claim 5, wherein said record bearing medium is of a disc shape.

8. An apparatus according to claim 7, wherein said disc-shaped record bearing medium possesses a plurality of concentrical recording tracks.

9. An apparatus according to claim 8, further comprising control means for causing said recording head to perform recording on said plurality of tracks one after another from an outer circumferential side to an inner circumferential side of said record bearing medium.

10. A recording apparatus for recording on each of a plurality of tracks formed on a medium, comprising:
    a) discriminating means for discriminating an exchange of said record bearing relative to said recording apparatus while main power of said recording apparatus is shut down;
    b) means for detecting a presence or absence of a record on a detecting position of said medium by detecting whether there is any record or no record on the detection position, depending upon the exchange of said recording medium discriminated by said discriminating means;
    c) means for renewing said detection position of said detecting means at a position shifted by a predetermined pitch sequentially from an end of said medium;
    d) means for operating said detecting means at a detection position renewed by said renewing means;
    e) recording means for recording on the tracks of said medium; and
    f) control means for accessing a track, adjacent to a track first detected to have a record thereon by said detecting means, said control means controlling said recording means when said detecting means performs such first detection by operation of said operating means so as to allow said recording means to record on said adjacent track.

11. A device according to claim 12, wherein said detecting means includes:
    a) means for reproducing the signals recorded on said tracks; and
    b) means for discriminating the presence or absence of the record from the level of the signals reproduced by said reproducing means.

12. A device according to claim 11, wherein said renewal means includes:
    a) a mechanical structure enabling shift of a reproducing position of said reproducing means; and
    b) means for causing said mechanical structure to renew the reproducing position of said reproducing means at each renewal by one track.

13. A device according to claim 11, wherein said operation means operates said discriminating means.

14. A device according to claim 11, wherein said reproducing means includes a record reproducing head, and said recording means includes means for generating a recording signal, connected to said record reproducing head.

15. A device according to claim 10, wherein said medium is disc-shaped.

16. A method of determining a record starting position of a recording apparatus for sequentially recording image signals at every predetermined pitch in a first direction from a first end toward a second end on a recording medium, comprising:
   a) a step of discriminating an exchange of said recording medium relative to said recording apparatus while main power of said recording apparatus is shut down;
   b) a step of accessing detecting means for detecting presence or absence of record on said recording medium to a record position and causing said detecting means to detect the presence or absence of a record, depending upon the exchange of said recording medium discriminated in said discriminating step;
   c) a step of accessing said detecting means to said second end and causing said detecting means to detect the presence or absence of a recorded information signal; and
   d) a step of determining a record starting position shifted by said predetermined pitch in said first direction from the record position where the presence of record is first detected when a detection part of said recording medium is shifted in a second direction opposite to said first direction from said second end.

17. A method according to claim 16, including arranging said detecting means to detect presence or absence of record on said recording medium by reproducing a signal recorded on said recording medium.

18. A method according to claim 16, wherein the step of detecting presence or absence of said record includes:
   (a) shifting said detecting means to said second end; and
   (b) operating said detecting means following shifting of said detecting means to said second end.

19. A method according to claim 16, wherein said predetermined pitch corresponds to one track.

20. A method according to claim 16, wherein said recording medium is disc-shaped.

21. A method for determining a position for starting recording in a recording device in which the recording is performed successively from a first to a second end position of a record bearing medium whereby a detecting means for detecting the presence of a record on an exchangeable record bearing medium has access to the recording positions of the record bearing medium and detects the presence or the absence of a record, the exchange of said record bearing medium being detected while main power of said recording device is shut down, and said detecting means is shifted to said second end position on the assumption that the exchange of said bearing medium has been detected, discrimination being effected by taking off and insertion of said record bearing medium, said method including a first mode in which the starting recording position is determined while the presence of record is detected from said second end position, and a second mode in which the starting record position is determined without shifting said detecting means to said second end position only on the assumption that the exchange of said record bearing medium has not been detected.

22. A method according to claim 21, wherein said record bearing medium is a disc and said first end is on an outermost track of said disc while said second end is on an innermost track of said disc.

23. A method according to claim 21, including using a mechanical memory to detect the exchange of said record bearing medium while said recording device is in a non-operating condition.

24. A method according to claim 21, wherein in said first mode the exchange of said record bearing medium is detected and said detecting means is shifted to said second end position when a power source for said recording device is turned on.

25. A method according to claim 21, and further comprising displaying a warning when said starting record position cannot be determined in said first mode.

* * * * *